(12) United States Patent
Taneja

(10) Patent No.: US 9,414,274 B2
(45) Date of Patent: *Aug. 9, 2016

(54) METHOD AND APPARATUS FOR PERFORMING HANDOVER IN A WIRELESS COMMUNICATION SYSTEM

(71) Applicant: Apple Inc., Cupertino, CA (US)

(72) Inventor: Mukesh Taneja, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,186

(22) Filed: Dec. 8, 2015

(65) Prior Publication Data

US 2016/0095027 A1 Mar. 31, 2016

Related U.S. Application Data

(63) Continuation of application No. 13/493,927, filed on Jun. 11, 2012, now Pat. No. 9,237,495, which is a continuation of application No. 12/400,834, filed on Mar. 10, 2009, now Pat. No. 8,199,719.

(30) Foreign Application Priority Data

Mar. 13, 2008 (IN) .............................. 633/DEL/2008

(51) Int. Cl.
*H04W 36/02* (2009.01)
*H04W 36/14* (2009.01)

(52) U.S. Cl.
CPC ............ *H04W 36/023* (2013.01); *H04W 36/02* (2013.01); *H04W 36/14* (2013.01)

(58) Field of Classification Search
CPC .... H04W 36/02; H04W 36/023; H04W 36/14
See application file for complete search history.

(56) References Cited

U.S. PATENT DOCUMENTS

| | | | |
|---|---|---|---|
| 7,321,570 B2 | 1/2008 | Ratasuk et al. | |
| 7,321,780 B2 | 1/2008 | Love et al. | |
| 7,376,424 B2 | 5/2008 | Kim et al. | |
| 7,382,750 B2 | 6/2008 | Wu | |
| 7,400,885 B2 | 7/2008 | Bakri | |

(Continued)

OTHER PUBLICATIONS

3 GPP TS 23.401, V8.4. 1, Dec. 2008, 3rd Generation Partnership Project, Technical Specification Group Services and System Aspects, General Packet Radio Service (GPRS) enhancements for Evolved Universal Terrestrial Radio Access Network (E-UTRAN) access, Release 8, http://www.3gpp.org, cited by other.

*Primary Examiner* — Paul H Masur
(74) *Attorney, Agent, or Firm* — Meyertons, Hood, Kivlin, Kowert & Goetzel, P.C.

(57) ABSTRACT

A method for performing handover by wireless User Equipment (UE) is provided. The UE includes a Long Term Evolution-Mobile Extreme Convergence (LTE-MXC) application processor, a LTE processor and a Digital Signal Processor (DSP). The UE buffers a set of IP packets when a Radio Access Technology (RAT) indicator is less than a predefined threshold and sends the set of IP packets to the LTE processor and the DSP. The LTE processor transmits the set of IP packets to the LTE network and sends acknowledgement signals to the LTE-MXC application processor and the DSP. When the handover is complete, the LTE processor sends the transmission status of the set of IP packets to the DSP. The UE also includes multimode Radio Resource Control (RRC) and Non-Access Stratum (NAS) modules.

20 Claims, 11 Drawing Sheets

(56) References Cited

U.S. PATENT DOCUMENTS

| | | |
|---|---|---|
| 7,430,420 B2 | 9/2008 | Derakhshan et al. |
| 7,433,334 B2 | 10/2008 | Marjelund et al. |
| 7,437,152 B2 | 10/2008 | Ishikawa et al. |
| 7,447,181 B1 | 11/2008 | Forssell |
| 7,466,683 B2 | 12/2008 | Bassompierre et al. |
| 7,471,654 B2 | 12/2008 | Mueckenheim et al. |
| 7,480,519 B2 | 1/2009 | Jeong et al. |
| 7,480,721 B2 | 1/2009 | Shaheen |
| 7,486,654 B2 | 2/2009 | Yoneta |
| 7,493,087 B2 | 2/2009 | Dillon |
| 7,496,066 B2 | 2/2009 | Speltacker et al. |
| 7,496,068 B2 | 2/2009 | Chen |
| 7,496,374 B2 | 2/2009 | Malkamaki |
| 7,496,383 B2 | 2/2009 | Kurata et al. |
| 7,969,924 B2 | 6/2011 | Young et al. |
| 2005/0002407 A1 | 1/2005 | Shaheen et al. |
| 2005/0003819 A1 | 1/2005 | Wu |
| 2005/0037758 A1 | 2/2005 | Rimoni |
| 2005/0070287 A1 | 3/2005 | Cave et al. |
| 2005/0096054 A1 | 5/2005 | Zhang et al. |
| 2005/0107094 A1 | 5/2005 | Hulkkonen et al. |
| 2006/0067276 A1 | 3/2006 | Bi et al. |
| 2007/0153722 A1 | 7/2007 | Gillies et al. |
| 2007/0173283 A1 | 7/2007 | Livet et al. |
| 2007/0218903 A1 | 9/2007 | Grech |
| 2007/0297367 A1 | 12/2007 | Wang et al. |
| 2008/0101295 A1 | 5/2008 | Tomita et al. |
| 2008/0102896 A1 | 5/2008 | Wang et al. |
| 2008/0233992 A1 | 9/2008 | Oteri et al. |
| 2008/0253334 A1 | 10/2008 | Torsner et al. |
| 2008/0267156 A1 | 10/2008 | Gubeskys et al. |
| 2009/0010269 A1 | 1/2009 | Larsson et al. |
| 2009/0042576 A1 | 2/2009 | Mukherjee et al. |
| 2009/0111423 A1 | 4/2009 | Somasundaram et al. |
| 2009/0170555 A1 | 7/2009 | Olvera-Hernandez et al. |
| 2010/0002650 A1 | 1/2010 | Ahluwalia |
| 2010/0008329 A1 | 1/2010 | De Jong et al. |
| 2010/0136977 A1 | 6/2010 | Gazzard |
| 2010/0254321 A1 | 10/2010 | Kim et al. |
| 2010/0309886 A1 | 12/2010 | Vikberg et al. |

METHOD AND APPARATUS FOR PERFORMING HANDOVER IN A WIRELESS COMMUNICATION SYSTEM

This application is a continuation of U.S. patent application Ser. No. 13/493,927, filed Jun. 11, 2012, entitled "METHODS AND APPARATUS FOR PERFORMING HANDOVER BETWEEN A LONG TERM EVOLUTION (LTE) NETWORK AND ANOTHER TYPE OF RADIO ACCESS NETWORK", now U.S. Pat. No. 9,237,495, which is a continuation of U.S. patent application Ser. No. 12/400,834, filed Mar. 10, 2009, of the same title, now U.S. Pat. No. 8,199,719, the entirety of which are incorporated herein by reference.

BACKGROUND OF THE INVENTION

The present invention relates to wireless communication systems. In particular, the present invention relates to a method and apparatus for performing a handover between a Long Term Evolution (LTE) network and a second generation (2G)/third generation (3G) radio access network.

The advances made in wireless communication technology have resulted in the development of numerous mobile communication standards. These standards are broadly categorized into second generation (2G), third generation (3G) and the future, fourth generation (4G) technologies. Examples of 2G/3G technologies include Global System for Mobile communications (GSM), General Packet Radio Service (GPRZ), Enhanced Data rates for GSM Evolution (EDGE), Universal Mobile Telecommunications System (UMTS), and the like. The UMTS standard evolved to LTE technology under the Third Generation Partnership Project (3GPP). LTE technology offers a wireless broadband system with higher data rates, lower latency, and higher spectrum efficiency. It is expected that LTE networks will be deployed in densely populated geographical areas, in the initial phases. Thus, mobile terminals may have to perform handover between the LTE networks and the 2G/3G networks so that users can seamlessly move across geographical areas covered by different networks without an interruption in communication.

Certain mobile terminals available today are capable of operating in LTE as well as 2G/3G networks. These mobile terminals employ multiple protocol stacks for wireless communication. Due to the employment of multiple protocol stacks, these mobile terminals can perform a handover between the LTE network and the 2G/3G network. However, the presence of the multiple protocol stacks increases the architectural complexity of the mobile terminals. While the handover is being performed, some of the IP packets generated by the applications running on these mobile terminals may not reach their destination. These IP packets are either lost during their transmission over the wireless connection or are not transmitted by the mobile terminals due to the absence of a free channel. Further, after the handover is complete, some of these IP packets belonging to delay sensitive applications may not be retransmitted by the mobile terminals as it may be too late to transmit those packets.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
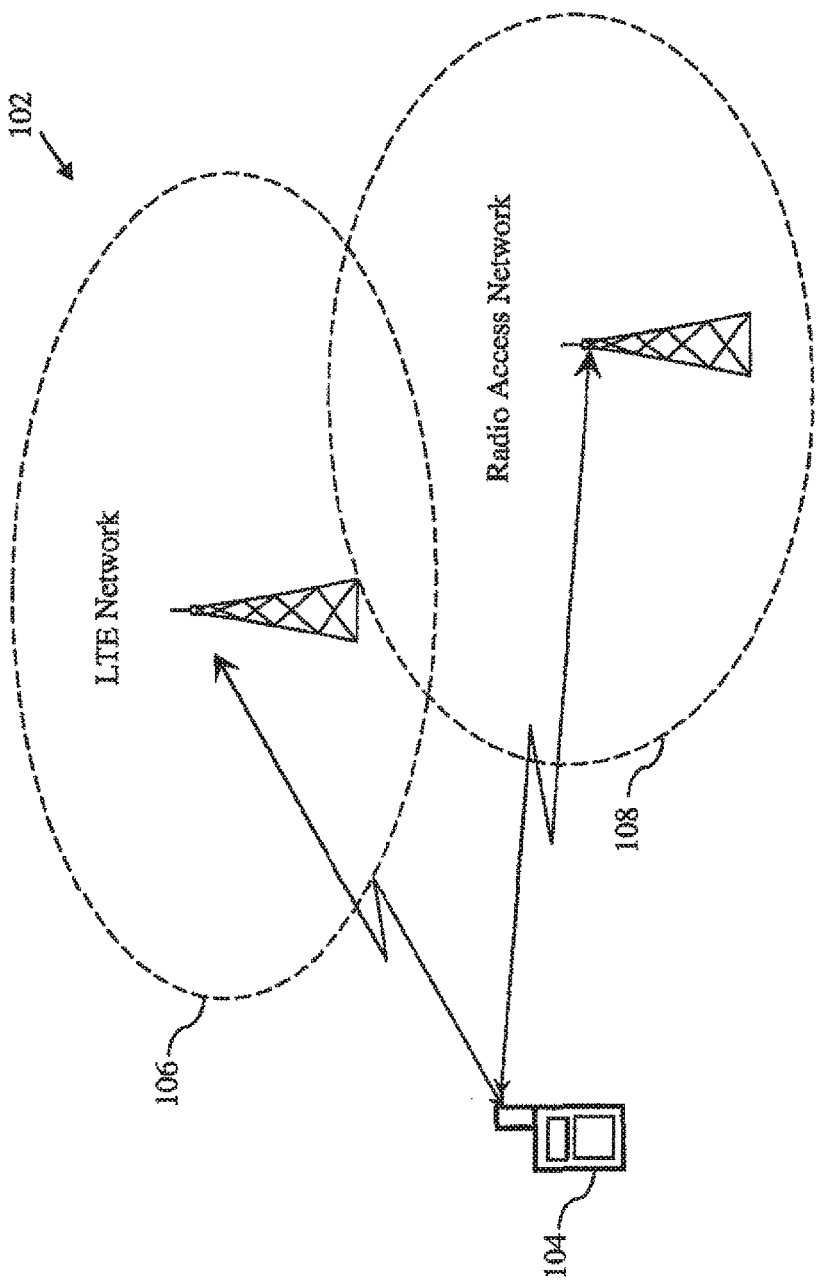
FIG. 1 is a schematic diagram illustrating an exemplary environment in which the present invention can be practiced, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for performing a handover by a wireless user equipment (UE) is provided. The wireless UE includes a Long Term Evolution-Mobile Extreme. Convergence (LTE-MXC) application processor, an LTE processor and a Digital Signal Processor (DSP) supporting MXC modem (UMTS/GSM) functionality. The MXC platform is a mobile phone architecture that separates the domain of application processing from the domain of communication (modem). This separation helps the developers to develop and continuously update applications without modifying the modem. The wireless UE communicates with wireless communication system that includes a plurality of Radio Access Networks (RANs). One of the RANs is a LTE network. The wireless UE buffers a set of IP packets when a Radio Access Technology (RAT) indicator is less than a pre-defined threshold. When the handover is initiated, the set of IP packets is sent to the LTE processor and the DSP. The LTE processor transmits the set of IP packets to the LTE network via a wireless connection between the wireless UE and the LTE network. Further, the LTE processor sends acknowledgement signals to the LTE-MXC application processor and the DSP. The acknowledgement signals indicate a successfully transmitted subset of IP packets. The successfully transmitted subset of IP packets includes IP packets that are received by the LTE network without getting lost during their transmission over the wireless connection. The successfully transmitted subset of IP packets are positively acknowledged of being received, by the LTE network to the wireless UE. When the handover is complete, the LTE processor sends messages to the DSP and LTE-MXC application processor. At least one of the messages indicates the transmission status of the set of IP packets. The transmission status indicates a subset of IP packets that has not been successfully transmitted by the LTE processor to the LTE network. The subset of IP packets includes IP packets that were not positively acknowledged of being received, by the LTE network to the wireless UE. The subset of IP packets also includes IP packets that were buffered at the LTE processor but could not be transmitted by the LTE processor over the wireless connection due to the handover. Once the handover is complete, the DSP transmits the subset of IP packets to one of the plurality of RANs based on the transmission status received from the LTE processor.

In another embodiment of the present invention, a wireless UE is provided. The wireless UE communicates with a wireless communication system that includes a plurality of RANs. One of the RANs is a LTE network. The wireless UE includes a multi-mode Radio Resource Control (MMd_RRC) module, a multi-mode Non-access Stratum (MMd_NAS) module, a LTE-MXC application processor, an LTE processor and a DSP. The MMd_RED module establishes a wireless connection between the wireless UE and at least one of the plurality of RANs. The MMd_NAS module establishes a wireless connection between the wireless UE and at least one of a core network providing circuit-switched services and a core network providing packet-switched services. The LTE-MXC application processor facilitates the generation, buffering and sending of IP packets. The LTE processor is operatively coupled to the LTE-MXC application processor and receives IP packets from the LTE-MXC application processor, sends messages to the LTE-MXC application processor and transmits IP packets to the LTE network. The DSP is operatively coupled to the LTE-MXC application processor and the LTE processor. The DSP receives IP packets from the LTE-MXC application processor, receives messages from the LTE processor and LTE-MXC application processor, and transmits IP packets to one of the plurality of RANs based on the received messages.

In yet another embodiment of the present invention, a wireless UE is provided. The wireless UE includes a LTE-MXC application processor, an LTE processor and a DSP supporting MXC modem (UMTS/GSM) functionality. The wireless UE also includes a multi-mode RRC (MMd_RRC) module and a multi-mode NAS (MMd_NAS) module. The MMd_RRC module operates in an MMd_RRC_detached state, an MMd_RRC_connected state and an MMd_RRC_idle state. In the MMd_RRC_detached state, the MMd_RRC module monitors a Radio Access Technology (RAT) indicator and establishes a wireless connection between the wireless UE and at least one of the wireless networks (an LTE cell, a UMTS cell and a GSM cell) in the vicinity of the wireless UE based on the RAT indicator. By establishing the wireless connection for data communication the MMd_RRC module performs a state transition to the MMd_RRC_connected state.

In the MMd_RRC_connected state, the MMd_RRC module performs a handover from an LTE_connected state to a UTRAN_connected state and vice-versa, performs a handover from the LTE_connected state to a GSM_connected state and vice-versa, and performs a handover from the LTE_connected state to the GSM_connected state via a GPRS_Packet_Transfer_Mode state and vice versa. Further, the MMd_RRC module performs a handover from the LTE_connected state to the GPRS_Packet_Transfer_Mode state and vice-versa, and performs a handover from the UTRAN_connected state to the GSM_connected state and vice-versa.

The MMd_RRC module performs a state transition to the MMd_RRC_idle state when there is no activity on the connected wireless network (i.e., one of the LTE cell, the UMTS cell and the GEM cell) for the wireless UE for a time period greater than a first predefined time threshold. The MMd_RRC module performs a state transition to the MMd_RRC_detached state when the wireless connection between the wireless UE and connected wireless network is released.

In the MMd_RRC_idle state, the MMd_RRC module performs a state transition to the MMd_RRC_detached state and performs a state transition to the MMd_RRC_connected state when there is new activity on at least one of the wireless networks.

The MMd_NAS module operates in an MMd_NAS_detached state, an MMd_NAS_connected state, and an MMd_NAS_idle state.

In the MMd_NAS_detached state, the MMd_NAS module establishes a wireless connection between the wireless UE and at least one of a core network providing circuit-switched services and a core network providing packet-switched services.

In the MMd_NAS_connected state, when the wireless UE is connected to the core network providing packet/circuit switched services, the MMd_NAS module performs a state transition to the MMd_NAS_idle state when the wireless connection between the wireless UE and one of the core networks is released. Further, the MMd_NAS module, when connected to the LTE network, performs a state transition to the MMd_NAS_idle state when an LTE network is inactive for a time period greater than a third predefined time threshold and performs a state transition to the MMd_NAS_detached state when the wireless connection between the wireless UE and the LTE network is released.

In the MMd_NAS_idle state, when wireless UE is in an LTE_Idle state, the MMd_NAS module performs a state transition to the MMd_NAS_connected state when there is new activity on the wireless connection between the wireless UE and the LTE network. Further, the MMd_NAS module performs a state transition to the MMd_NAS_connected state when the wireless connection between the wireless UE and at least one of the core network providing circuit switched services and the core network providing packet-switched services is established, and performs a state transition to the MMd_NAS_detached state.

Referring now to FIG. 1, a schematic diagram illustrating an exemplary wireless communication system. 102 with a wireless UE 104 is shown, in accordance with an embodiment of the present invention. Examples of the wireless UE 104 include a cellular phone, a smart phone, a Personnel Digital Assistant (PDA), a pager, a handheld computer and so forth. The wireless UE 104 is capable of operating within various RANs. The wireless communication system 102 includes an LTE network 106 and a RAN 108. Examples of the RAN 108 include, but are not limited to a 2G/3G radio access network like a GSM radio access network (GRAN), Universal Mobile Telecommunications System (UMTS) Terrestrial Radio Access Network (UTRAN), an Enhanced Data Rates for GSM Evolution (EDGE) Radio Access Network (GERAN), High Speed Packet Access (HSPA) Network. The wireless UE 104 establishes a wireless connection with either the LTE network 106 or the RAN 108. The wireless UE 104 also performs a handover between the LTE network. 106 and the RAN 108.

Figure 2:
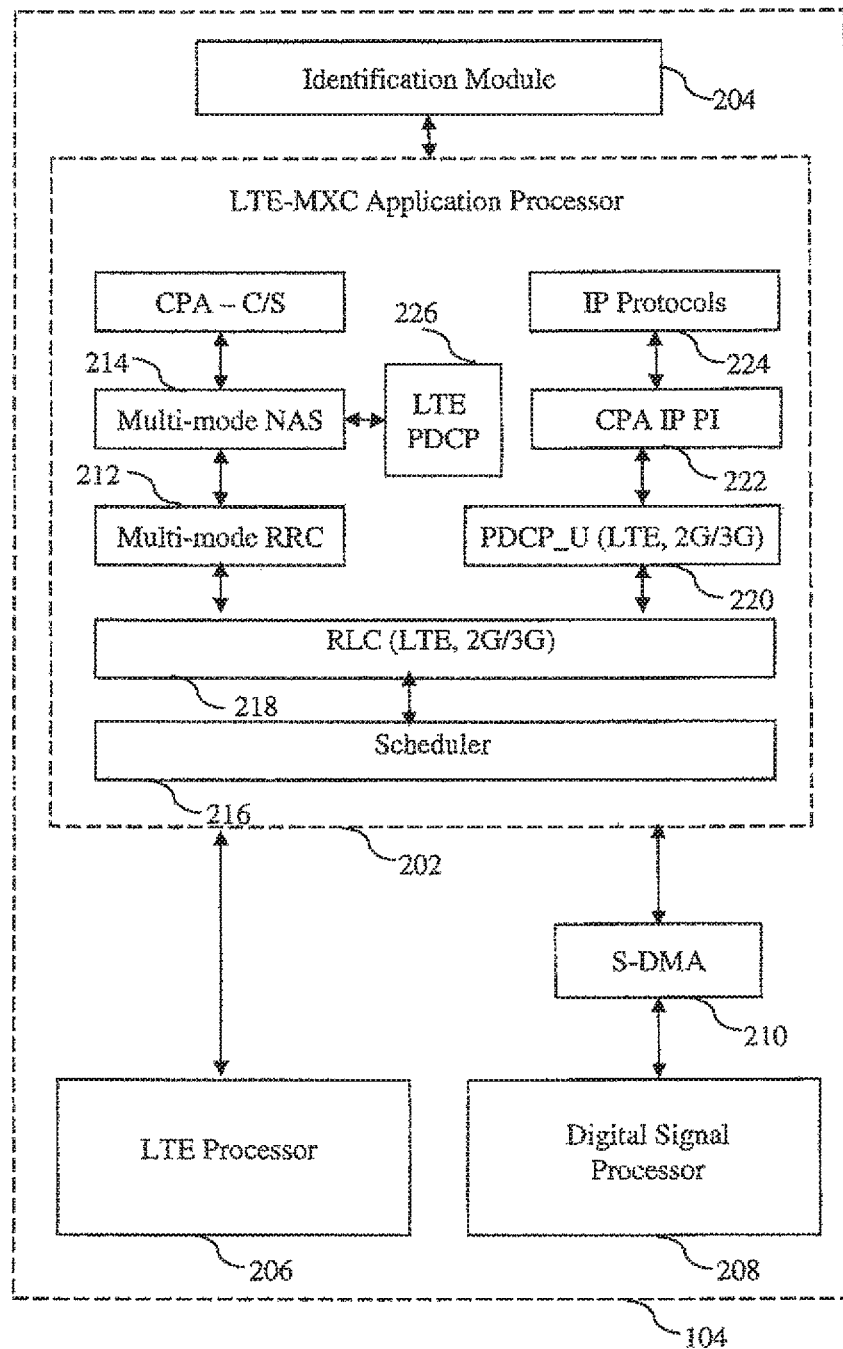
FIG. 2 is a block diagram illustrating the architecture of a wireless User Equipment (UE), in accordance with an embodiment of the present invention.

Referring now to FIG. 2, a block diagram illustrating the architecture of the wireless UE 104 is shown, in accordance with an embodiment of the present invention. The wireless UE 104 includes a LTE-MXC application processor 202, an Identification Module (IM) 204, an LTE processor 206 and a Digital Signal Processor (DSP) 208. The LTE-MXC application processor 202 is used for developing and executing applications. These applications can be multimedia applications that require very high data rates for providing multimedia data to the users in real-time. Examples of the multimedia applications include video conferencing, image processing applications, video playback, push-to-talk applications and the like. The LTE-MXC application processor 202 facilitates the generation, buffering and sending of IP packets to the LTE processor 206 and the DSP 208. The LTE-MXC application processor 202 sends IP packets to the LTE processor 206 or the DSP 208, when the wireless UE 104 is operating in the LTE network 106 or the RAN 108 respectively. The LTE-MXC application processor 202 stores IP packets in a buffer and sends IP packets to both the LTE processor 206 and the DSP 208 when the handover of the wireless UE 104 is initiated between the LTE network 106 and the RAN 108. In this embodiment, the LTE-MXC application processor 202 further receives messages from the LYE processor 206. Based on the received messages, the LTE-MXC application processor 202 drops IP packets. Dropping IP packets refers to deleting IP packets from the buffer. In one embodiment, the LTE-MXC application processor 202 is an Advanced RISC Machine (ARM™) application processor.

The Identification Module (IM) 204 contains data pertaining to the wireless UE 104 so that the wireless UE 104 can be authenticated by the LTE network 106 and the RAN 108. Based on the authentication, the wireless UE 104 connects to the LTE network 106 and the RAN 108. In an embodiment of the present invention, the wireless UE 104 is capable of operating in the LTE network 106 and the RAN 108. In this embodiment, the IM 204 includes a Subscriber Identification Module (SIM), a Universal Subscriber Identity Module (USIM), an IP Multimedia Services Identity Module (ISIM), and an LTE Subscriber Identity Module (LSIM). The SIM module and the USIM module are used for the authentication of the wireless UE 104 in the GERAN and the UTRAN respectively. The USIM module can also be used for the authentication of the wireless UE 104 in the LTE network 106. The ISIM module and the LSIM module contain data for the authentication of the wireless UE 104 in the IMS and the LTE network 106 respectively.

In one embodiment, the LTE processor 206 receives IP packets from the LTE-MXC application processor 202 and transmits IP packets to the LTE network 106 over a wireless connection. There is the possibility that some of the IP packets will not reach the LTE network 106, as they are lost during the transmission over the wireless connection. The reasons for this loss can be signal degradation over the wireless connection, an oversaturated wireless connection, IP packets that get corrupted and the like. These lost IP packets are not positively acknowledged of being received, by the LTE network 106 to the wireless UE 104. Further, in this embodiment, the LTE processor 206 sends messages to the LTE-MXC application processor 202 and the DSP 208. For example, these messages are acknowledgement signals that indicate successfully transmitted IP packets. The successfully transmitted IP packets are IP packets that were transmitted by the LTE processor 206 and were positively acknowledged of being received, by the LTE network 106 to wireless UE 104. The messages also include the transmission status of IP packets received by the LTE processor 206. The transmission status indicates IP packets that were not successfully transmitted by the LTE processor 206 to the LTE network 106, i.e., the IP packets that were not positively acknowledged of being received, by the LTE network 106 to wireless UE 104. The transmission status also indicates IP packets that were buffered by the LTE processor 206 but could not be transmitted by the LTE processor 206 over the wireless connect ion due to the handover from LTE network 106 to the RAN 108.

In one embodiment, the DSP 208 receives IP packets from the LTE-MXC application processor 202 and transmits IP packets to the RAN 108 via a wireless connection. Further, in the one embodiment, the DSP 208 stores IP packets received from the LTE-MXC application processor 202 in a local buffer. In this embodiment, the DSP 208 receives messages from the LTE processor 206. In one example, the messages are acknowledgement signals that indicate successfully transmitted IP packets that were positively acknowledged of being received, by the LTE network 106 to the wireless UE 104. Based on the received acknowledgement signals, the DSP 208 drops the successfully transmitted IP packets. Dropping of IP packets refers to deleting the successfully transmitted IP packets from the local buffer in the DSP 208. After the handover is complete, the DSP 208 receives the transmission status of the IP packets from the LTE processor 206. Based on the transmission status, the DSP 208 transmits the IP packets that were either transmitted by LTE processor 206 but not positively acknowledged of being received, by the LTE network 106 to the wireless UE 104 or could not be transmitted by the LTE processor 206 due to the handover. In one embodiment, the DSP 208 is a Starcore™ DSP such as the MSC8144 available from Freescale Semiconductor, Inc.

The LTE-MXC application processor 202 includes a multi-mode Radio Resource Control (MMd_RRC) module 212 and a multi mode Non-access Stratum (MMd_NAS) module 214. The MMd_RRC module 212 and the MMd_NAS module 214 operate using a multi-mode control protocol. The multi-mode control protocol is a single stack protocol that enables the wireless UE 104 to operate in the LTE network 106 and the RAN 108. The multi-mode control protocol also facilitates the handover of the wireless UE 104 between the LTE network 106 and the RAN 108.

When the wireless UE 104 is switched on, the MMd_RRC module 212 selects a wireless network for establishing a wireless connection between the wireless UE 104 and the selected wireless network. The selected wireless network can either be the RAN 108 or the LTE network 106. The selection is made based on the signal strength the wireless UE 104 receives from wireless networks (106, 108) in the vicinity of the wireless UE 104. In one embodiment, the selection can also be based on the policies defined by the user of the wireless UE 104 or the operators of the wireless networks (106, 108). The MMd_RRC module 212 also facilitates performing the handover of the wireless UE 104 between the LTE network 106 and the RAN 108. Further, in this embodiment, the MMd_RRC module 212 configures a scheduler 216, a radio link control (RLC) module 218 and the Packet Data Convergence Protocol (PDCP) modules (220 and 226) to send IP packets generated by the applications running on the LTE-MXC application processor 202 to the LTE processor 206 and the DSP 208. The MMd_RRC module 212 also facilitates performing policy related functions such as measurement control, mobility management, radio resource management, and setting up of channels. Setting up of channels includes the selection of a specific radio frequency over which the wireless connection is established.

In one embodiment, the MMd_NAS module 214 establishes a wireless connection between the wireless UE 104 and a core network that provides packet-switched services. The core network providing packet-switched services routes the IP packets originating from the wireless UE 104 to a destination UE via a channel that is shared with traffic originating from other user equipments (UEs). In this embodiment, the MMd_NAS module 214 also establishes a wireless connection between the wireless UE 104 and another core network that provides circuit-switched services. The core network providing circuit-switched services routes the IP packets originating from the wireless UE 104 to the destination UE via a fixed bandwidth channel that cannot be shared with traffic originating from other UEs. A core network also supports other functionalities such as authentication the wireless UE 104 that requests for a service from the core network, routing and billing calls made by the wireless UE 104, call waiting and call transfer.

The LTE-MXC application processor 202 also includes a Packet Data Convergence Protocol_User Plane (PDCP_U) module 220, a Common Platform Access Packet Interface (CPA_PI) module 222 and an IP Stack 224. The IP Stack 224 generates IP packets. The IP packets are sent to the PDCP_U module 220 via the CPA_PI module 222. The CPA_PI module 222 is used to adapt the architecture of the wireless UE 104 to applications developed using any Operating System (OS). The PDCP_U module 220 performs header compression on the IP packets and sends the compressed IP packets to the RLC module 218. The RLC module 218 sends the IP packets to the LTE processor 206 or the DSP 208 via the Scheduler 216.

In one embodiment, the LTE-MXC application processor 202 and the LTE processor 206 communicate via a High Speed Universal Serial Bus (USB). The LTE-MXC application processor 202 and the DSP 208 communicate via a Serial Direct Memory Access (S-DMA) link 210.

Figure 3:
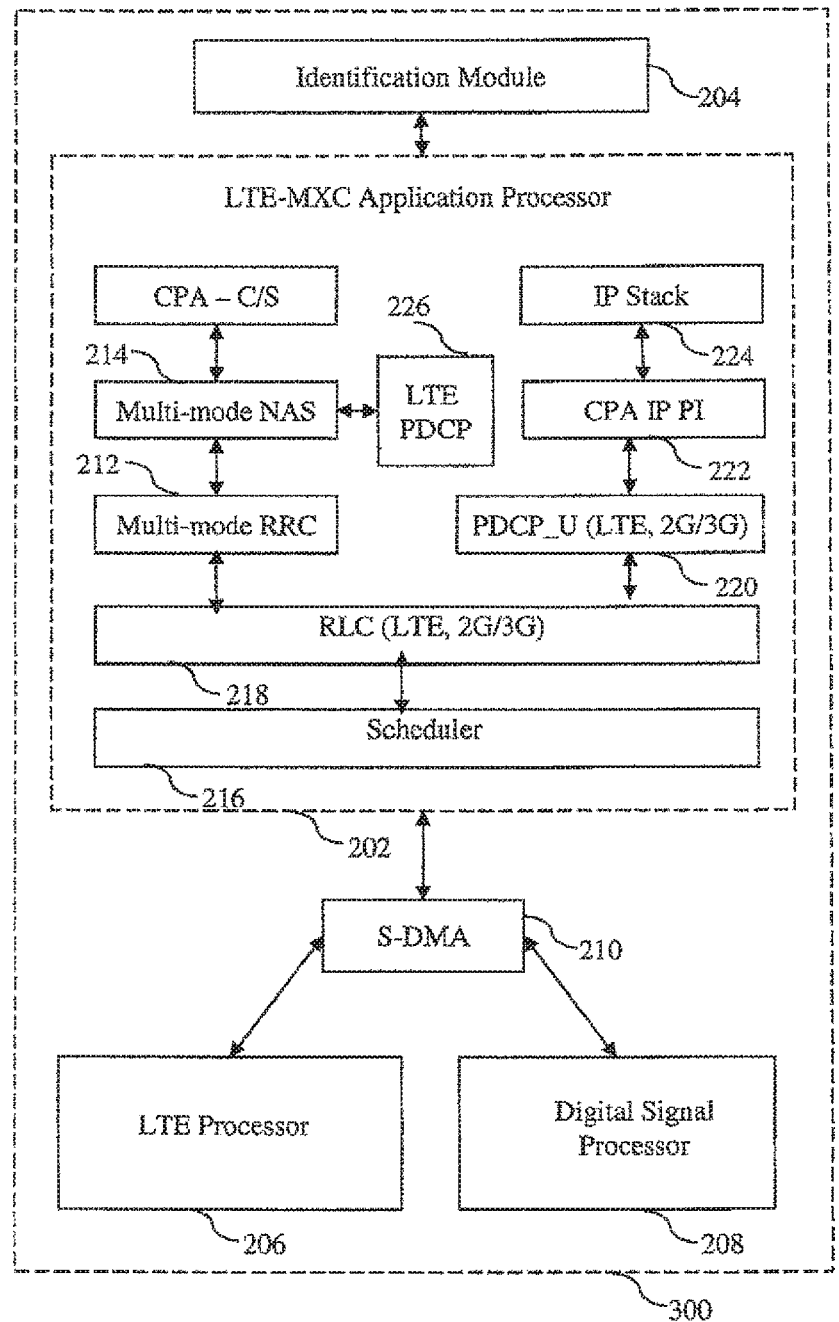
FIG. 3 is a block diagram illustrating the architecture of the wireless UE, in accordance with another embodiment of the present invention.

Referring now to FIG. 3, a block diagram illustrating the architecture of a wireless UE 300 is shown, in accordance with another embodiment of the present invention. The architecture is an example of the Mobile Extreme Convergence (MXC) platform architecture. The LTE-MXC application processor 202 and the LTE processor 206 communicate via the Serial Direct Memory Access (S-DMA) link 210. The S-DMA link 210 blocks the LTE processor 206 as a peripheral device and controls the movement of IP packets from LTE-MXC application processor 202 to the LTE processor 206 and vice-versa. Also, the S-DMA link 210 controls the movement of IP packets from LTE-MXC application processor 202 to the DSP 208 and vice-versa.

Figure 4:
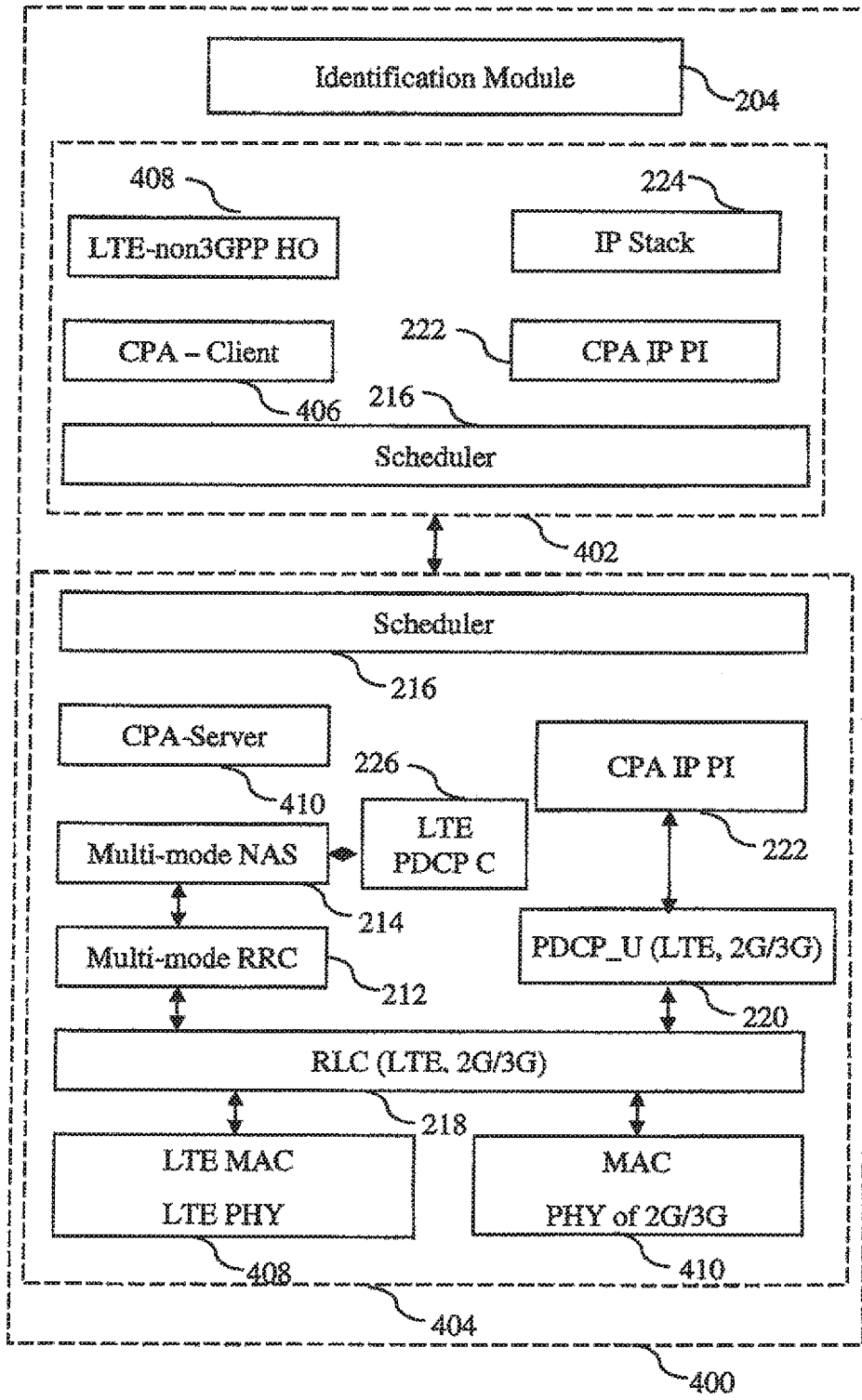
FIG. 4 is a block diagram illustrating the architecture of the wireless UE, in accordance with yet another embodiment of the present invention.

Referring now to FIG. 4, a block diagram illustrating the architecture of a wireless UE 400 is shown, in accordance with yet another embodiment of the present invention. The wireless UE 400 includes an application processor 402, a LTE-MXC baseband processor 404 and the identification module 204. The LTE-MXC baseband processor 404 includes the MMd_RRC module 212 and the MMd_NAS module 214. The architecture shown in FIG. 4 is an example of the MXC platform architecture. The underlying concept of this architecture is the separation of the two main domains of a wireless communication device: the communication domain (i.e., the modem) and the applications domain. The components of the communication domain (modem) are represented by the LTE-MXC baseband processor 404 that facilitates communication between the wireless UE 400 and the selected wireless network, whereas the components in the applications domain are represented by the application processor 402 that facilitates development and execution of applications. The LTE-MXC baseband processor 404 facilitates buffering and sending IP packets to the LTE network 106 and the RAN 108.

The wireless UE 400 further includes a CPA_Client module 406, an LTE-3GPP Handover (HO) module 408 and a CPA_Server 410. The CPA_Client module 406 is operatively coupled to the CPA_Server 410. The CPA_Client 406 receives IP packets from the IP Stack 224 and sends the received IP packets to the CPA_Server 410. The CPA_Server 410 translates the IP packets to a format that can be used by the MMd_NAS module 214. These IP packets are transmitted to the LTE network 106 via an LTE Media Access Control (MAC) module and an LTE Physical (PHY) module collectively represented by 412. These IP packets can also be transmitted to the RAN 108 via a MAC of 2G/3G networks module and a PHY of 2G/3G networks module collectively represented by 414.

Figure 5:
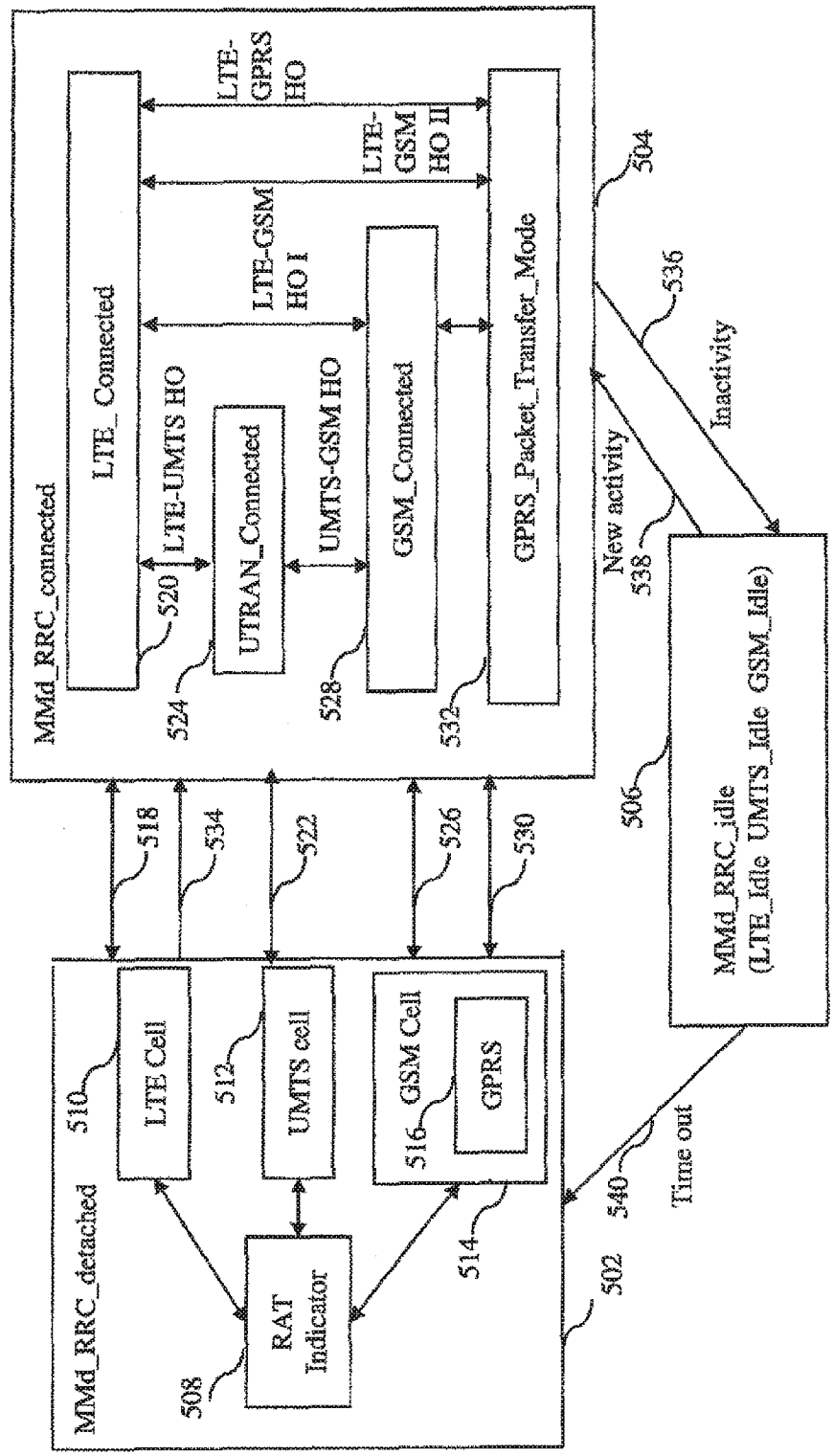
FIG. 5 is a block diagram illustrating the operating states of a multi mode Radio Resource Control (MMd_RRC) module, in accordance with an embodiment of the present invention.

Referring now to FIG. 5, a block diagram illustrating the operating states of the MMd_RRC module 212 is shown, in accordance with an embodiment of the present invention. The MMd_RRC module 212 operates in three states an MMd_RRC_detached state 502, an MMd_RRC_connected state 504 and an MMd_RRC_idle state 506. When the wireless UE 104 (300, 400) is switched on, it is in the MMd_RRC_detached state 502. In the MMd_RRC_detached state 502, the wireless UE 104 is not connected to any of the wireless networks in the vicinity of the wireless UE 104. In one example, the wireless networks include an LTE cell 510, an UMTS cell 512 and a GSM cell 514. The MMd_RRC module 212 selects one of the wireless networks 510, 512, 514 for establishing a wireless connection between the wireless UE 104 and the selected wireless network. The selection is made based on the monitoring of a RAT indicator 508. The RAT indicator 508 indicates the signal strength the wireless UE receives from the wireless networks 510, 512, 514. In one embodiment, the RAT indicator 508 indicates the policies made by the user of the Wireless UE 104 or the operators of the wireless networks 510, 512, 514. On establishing the wireless connection, the MMd_RRC module 212 makes a state transition to the MMd_RRC_connected state 504. In the MMd_RRC_connected state 504, IP packets can be actively transmitted over the wireless connection between the wireless UE 104 and the selected wireless network.

In one embodiment, the MMd_RRC module 212 establishes the wireless connection between the wireless UE 104 and the LTE cell 512 by an LTE Registration as indicated by 518. On establishing the wireless connection the MMd_RRC module 212 performs a state transition to an LTE_connected state 520.

In this embodiment, the MMd_RRC module 212 establishes the wireless connection between the wireless UE 104 and the UMTS cell 512 via an UMTS_RRC_Connection as indicated by 522 and performs a state transition to an UTRAN_connected state 524.

In this embodiment, the MMd_RRC module 212 establishes the wireless connection between the wireless UE 104 and the GSM cell 514 via a GSM_RRC_Connection as indicated by 526 and performs a state transition to a GSM_connected state 528. The GSM cell 514 also supports GPRS 516 that enables data transfer over the wireless connection between the wireless UE 104 and the GSM cell 514. On the initiation of a data session as indicated by 530, the MMd_RRC module 212 performs a state transition to a GPRS_Packet_Transfer_Mode 532.

In one embodiment, the MMd_RRC module 212 performs a state transition to the MMd_RRC_connected state 504 by Cell Reselection as indicated by 534 to select one of the wireless networks 510, 512 and 514 for the wireless connection.

The wireless UE 104 can also perform a handover (LTE-UMTS HO) from the LTE cell 510 to the UMTS cell 512 when the MMd_RRC module 212 performs a state transition from the LTE_connected state 520 to the UTRAN_connected state 524, and vice versa.

In this embodiment, the wireless UE 104 performs a handover (LTE-GSM HO I) from the LTE cell 510 to the GSM cell 514 when the MMd_RRC module 212 performs a state transition from the LTE_connected state 520 to the GSM_connected state 528, and vice versa.

The wireless UE 104 performs a handover (LTE-GSM HO II) from the LTE cell 510 to the GSM cell 514 when the MMd_RRC module 212 performs a state transition from the LTE_connected state 520 to the GSM_connected state 528 via the GPRS_Packet_Transfer Mode 532, and vice versa.

The wireless UE 104 performs a handover (LTE-GPRS HO) from the LTE cell 510 to the GSM cell 514 when the MMd_RRC Module 212 performs a state transition from the LTE_connected state 520 to the GPRS_Packet_Transfer_Mode 532, and vice versa.

The wireless UE 104 performs a handover (UMTS-GSM HO) from the UMTS cell 512 to the GSM cell 514 when the MMd_RRC module 212 performs a state transition from the UTRAN_connected state 524 to the GSM_connected state 528, and vice versa.

The MMd_RRC module 212 also performs a state transition from the MMd_RRC_connected state 504 to the MMd_RRC_detached state 502 by a LTE Deregistration as indicated by 518, release of the UMTS_RRC_Connection as indicated by 522, release of the GSM_RRC_Connection as indicated by 526 or end of the data session as indicated by 530.

In the MMd_RRC_idle state 506, only the control signals can be transmitted over the wireless connection between the wireless UE 104 and the selected wireless network.

In one embodiment, the MMd_RRC module 212 performs a state transition from MMd_RRC_connected state 504 to the MMd_RRC_idle state 506 when there is inactivity as indicated by 536 in the selected wireless network for a time period that is greater than a first pre-defined time threshold. Inactivity in the selected wireless network refers to the absence of IP packets for the wireless UE 104 over the wireless connection between the wireless UE 104 and the selected wireless network. The MMd_RRC_idle state 506 includes the LTE_idle state, an UMTS_idle state and a GSM_idle state. In an example, when the selected wireless network is the LTE cell 510, the MMd_RRC module 212 performs a state transition from LTE_connected state 520 to the LTE_idle state when there is inactivity as indicated by 536 in the LTE cell 510 or a time period that is greater than the first pre-defined time threshold.

The MMd_RRC module 212 performs a state transition from MMd_RRC_idle state 506 to the LTE_connected state 520 when there is a new activity as indicated by 538 over the wireless connection between the wireless UE 104 and the selected wireless network 510. The new activity is determined by an attempt to transmit IP packets between the wireless UE 104 and the selected wireless network. In an example, when the selected wireless network is the LTE cell 510, the MMd_RRC module 212 performs a state transition from the MMd_LTE_idle state to the LTE_connected state 520 when there is new activity as indicated by 538 over the wireless connection between the wireless UE 104 and the LTE cell 510. The MMd_RRC module 212 performs a state transition from the MMd_RRC_idle state 506 to the MMd_RRC_detached state 502 when there is a time-out as indicated by 540. The time-out 540 occurs when there is no new activity over the wireless connection between the wireless UE 104 and the selected wireless network for a time period that is greater than a second pre-defined time threshold.

In this embodiment, the UTRAN_connected state 524 includes four substates. The four states are the URA_PCH state, the Cell_PCH state, the Cell_DCH state and the Cell_FACH state. In the Cell_DCH state and the Cell_FACH state, the wireless UE 104 continuously monitors the wireless connection between the wireless UE 104 and the UMTS cell 512 for IP packets. Further, although IP packets are not transmitted between the wireless UE 104 and the UMTS cell 512 in the URA_PCH state and the Cell_PCH state, the wireless UE 104 monitors the wireless connection for paging signals transmitted by the UMTS cell 512.

Figure 6:
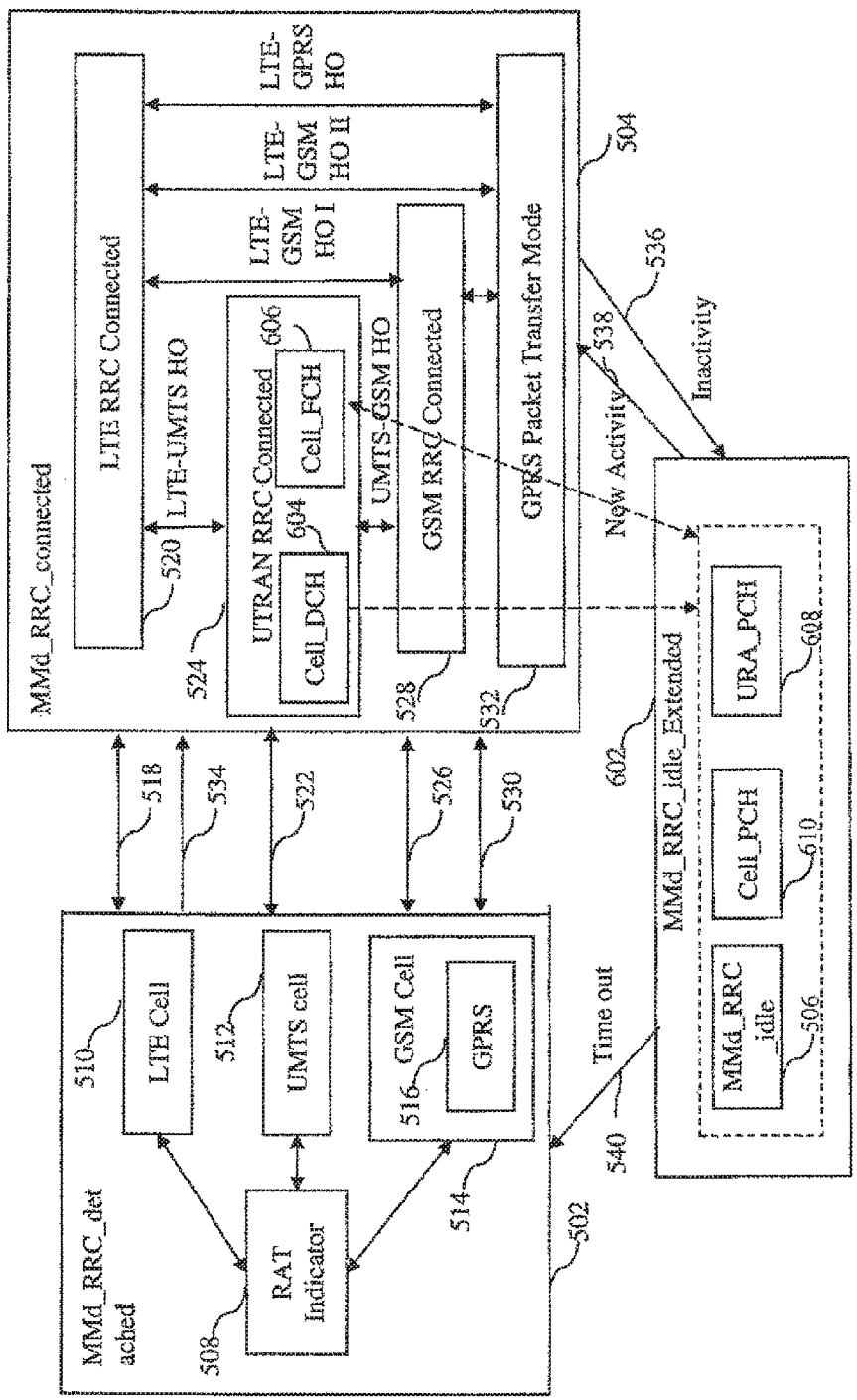
FIG. 6 is a block diagram illustrating the operating states of the MMd_RRC module, in accordance with another embodiment of the present invention.

Referring now to FIG. 6, a block diagram illustrating the operating states of the MMd_RRC module 212 is shown, in accordance with another embodiment of the present invention. In this embodiment, the MMd_RRC module 212 operates in three states the MMd_RRC_detached state 502, the MMd_RRC connected state 504 and an MMd_RRC_idle_Extended state 602. The UTRAN_connected state 524 of the MMd_RRC_connected state 504 includes two substates, the Cell_DCH state 604 and the Cell_FACH state 606. The MMd_RRC_idle_Extended state 602 includes the MMd_RRC_idle state 506, the URA_PCH state 608 and the Cell_PCH state 610. This embodiment provides for an efficient implementation of the architecture of the wireless UE 104. Also, the specifications required for this architecture are simpler.

Figure 7:
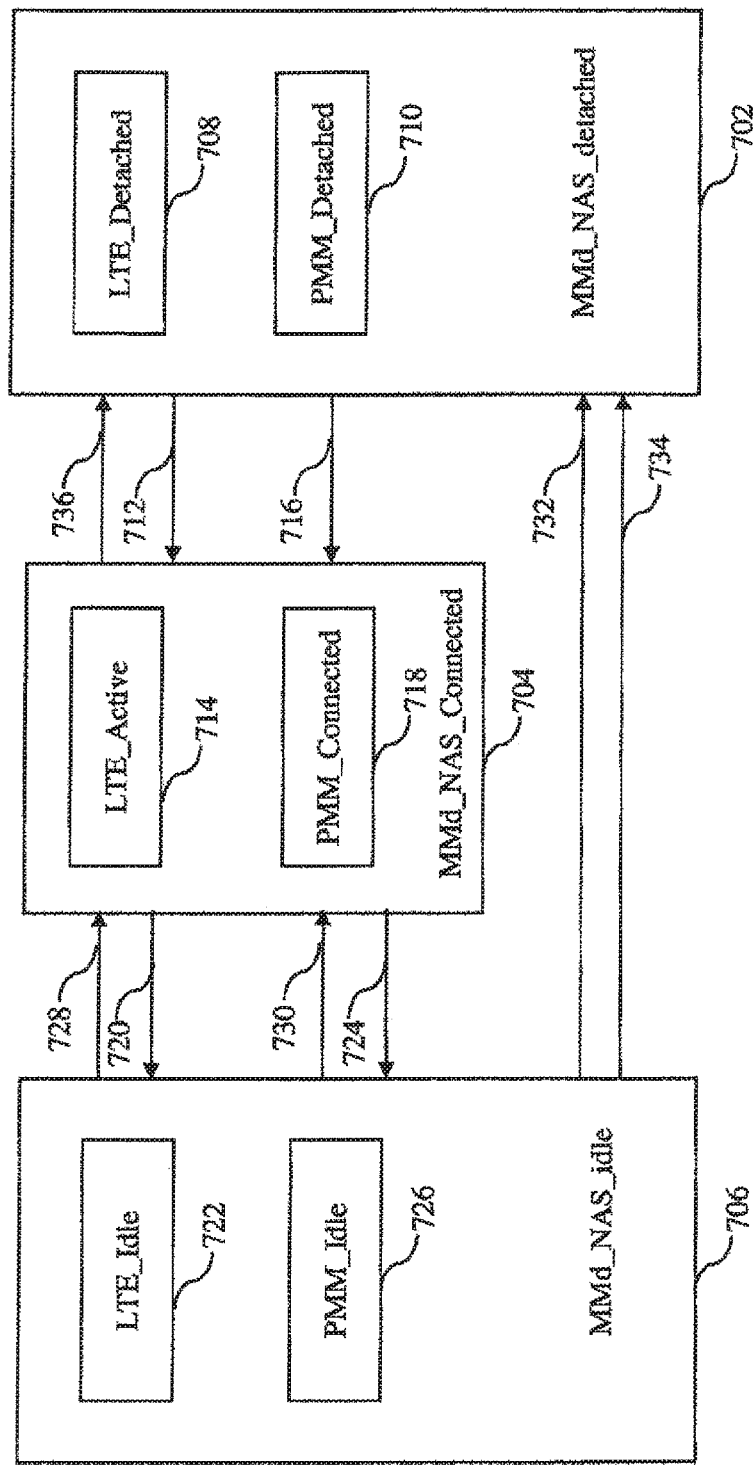
FIG. 7 is a block diagram illustrating the operating states of a multi-mode Non-Access Stratum (MMd_NAS) module, in accordance with an embodiment of the present invention.

Referring now to FIG. 7, a block diagram illustrating the operating states of the MMd_NAS module 214 is shown, in accordance with an embodiment of the present invention. The MMd_NAS module 214 operates in an MMd_NAS_detached state 702, an MMd_NAS_connected state 704, and an MMd_NAS_idle state 706. When the wireless UE 104 is switched on, the MMd_NAS module 214 is in the MMd_NAS_detached state 702. In the MMd_NAS_detached state 702, the wireless UE 104 is not connected to the LTE network 106, a core network providing circuit-switched services or core network providing packet-switched services. The core network providing packet-switched services can be any 2G/3G packet-Switched core network. The MMd_NAS_detached state 702 includes an LTE_Detached state 708 and a Packet Mobility Management (PMM)_Detached state 710. The wireless UE 104 is not connected to the LTE network 106 in the LTE_Detached state 708. The wireless UE 104 is not Connected to the core network providing packet-switched services in the PMM_Detached state 710. The MMd_NAS module 214 establishes a wireless connection between the wireless UE 104 and the LTE network 106 by performing an LTE registration as indicated by 712. On establishing the wireless connection, the MMd_NAS module. 214 performs a state transition to an LTE_Active state 714 of the MMd_NAS_connected state 704. In this embodiment, the MMd_NAS module 214 establishes a wireless connection between the wireless UE 104 and the core network providing packet-switched services by performing a Packet Switch (PS) Attach as indicated by 716. On establishing the wireless connection, the MMd_NAS module 214 performs a state transition to a PMM_Connected state 718 of the MMd_NAS_connected state 704. In the PMM_Connected 718, data packets and control signals can be transmitted over the wireless connection between the wireless UE 104 and the core network providing packet-switched services.

In the LTE_Active state 714, the MMd_NAS module 214 performs a state transition 720 to an LTE_idle state 722 of the MMd_NAS_idle state 706 when the LTE network 106 is inactive for a time period that is greater than a third predefined time threshold. In one embodiment, the MMd_NAS module 214 performs a state transition from the PMM_Connected state 728 to a PMM_Idle state 726 of the MMd_NAS_idle state 706 when a Packet Switched (PS) Signaling Connection is released, as indicated by 724. In the PMM_Idle state 726, only control signals can be transmitted over the wireless connection between the wireless UE 104 and the core network providing packet-switched services.

In one embodiment, the MMd_NAS module 214 performs a state transition from the LTE_idle state 722 to the LTE_Active state 714 when there is a new activity as indicated by 728 over the wireless connection between the wireless UE 104 and the LTE network 106. Further, the MMd_NAS module 214 performs a state transition from the PMM_Idle state 726 to the PMM_Connected state 718 when a PS Signaling Connection is established as indicated by 730. Furthermore, the MMd_NAS module 214 performs a state transition from the LTE_idle state 722 to the LTE_Detached 708 when there is a timeout as indicated by 732. The timeout 732 occurs when there is no new activity on the LTE network 106 for a time period that is greater than a fourth pre-defined time threshold. The MMd_NAS module 214 performs a state transition from the PMM_Idle state 726 to the PMM_Detached 710 by performing a PS Detach as indicated by 734.

In one embodiment, the MMd_NAS module 214 performs a state transition from the LTE_Active state 714 to the LTE_Detached state 708 by performing a LTE Deregistration as indicated by 736. Further, the MMd_NAS module 214 performs a state transition from the LTE_Active state 714 to the LTE_Detached 708 when there is a change in the Public Land Mobile Network (PLMN) to which the wireless UE 104 belongs as indicated by 736.

Figure 8:
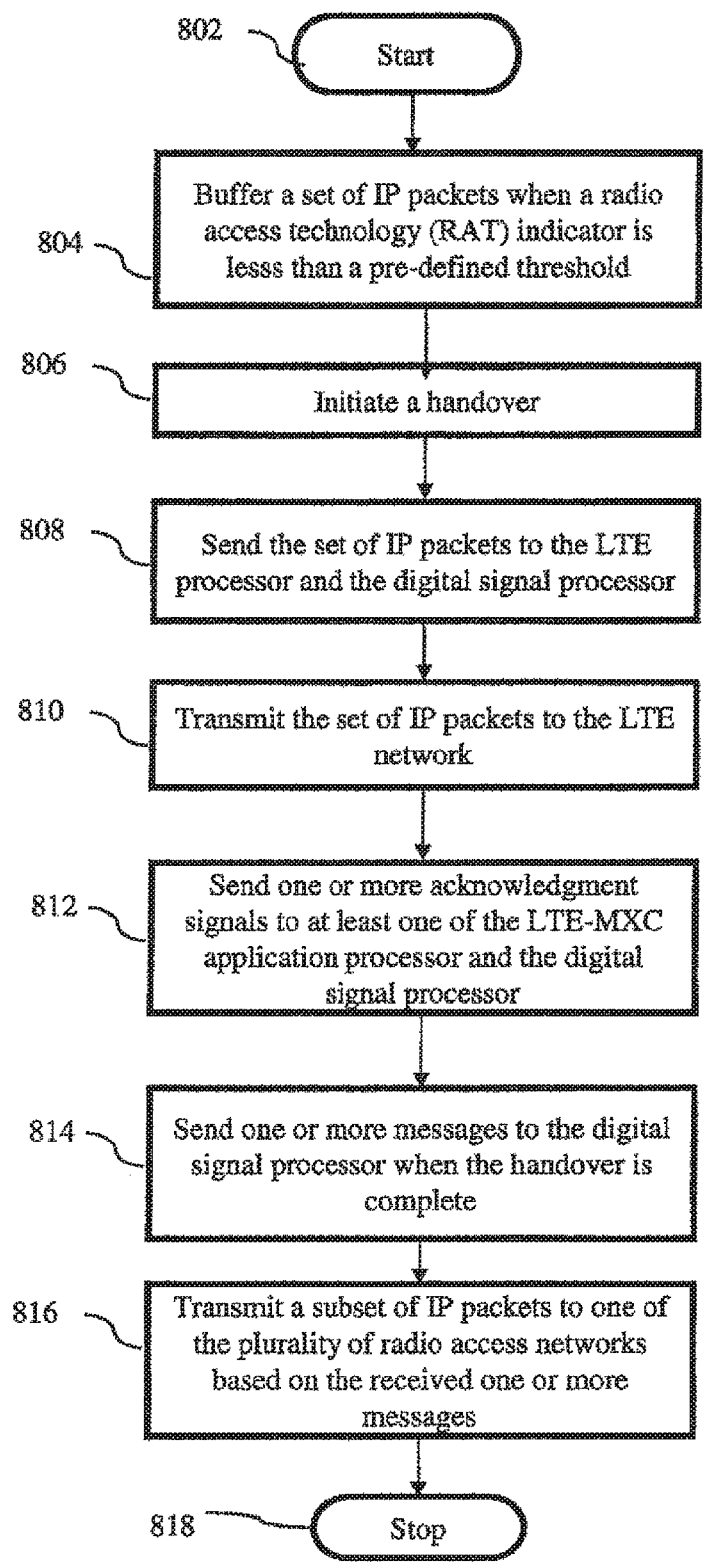
FIG. 8 is a flow diagram illustrating a method for performing a handover between a LT) network and a 2G/3G network, in accordance with an embodiment of the present invention.

Referring now to FIG. 8, a flow diagram illustrating a method for performing handover between the LTE network 106 and the 2G/3G RAN 108 is shown, in accordance with an embodiment of the present invention. The method starts at step 802, where the wireless UE 104 is connected via a wireless connection with the LTE network 106.

At step 804, the LTE-MXC application processor 202 buffers a set of IP packets by storing the set of IP packets in the buffer when the RAT indicator 508 is less than a predefined threshold. In one embodiment, the LTE-MXC application processor 202 buffers the set of IP packets when the signal strength the wireless UE 104 received from the LTE network 106 is below the pre-defined threshold of signal strength.

At step 806, the handover is initiated by the LTE network 106 or by the wireless UE 104.

At step 808, the LTE-MXC application processor 202 sends the set of IP packets to the LTE processor 206 and the DSP 208. In one embodiment, the set of IP packets is sent to the LTE processor 206 via a USE. In another embodiment, the set of IP packets is sent to the LTE processor 206 and the DSP 208 via the S-DMA link 210.

At step 810, the LTE processor 206 transmits the set of IP packets to the LTE network 106 via the wireless connection between the wireless UE 104 and the LTE network 106.

At step 812, the LTE processor 206 sends acknowledgement signals to the LTE-MXC application processor 202 and the DSP 208. These acknowledgement signals indicate a successfully transmitted subset of IP packets. The successfully transmitted subset of IP packets includes IP packets that have been positively acknowledged of being received, by LTE network 106 to wireless UE 104.

At step 814, the LTE processor 206 sends messages to the DSP 208 when the handover is complete after a wireless connection is established between the wireless UE 104 and the RAN 108. The messages include the transmission status of the set of IP packets received by the LTE processor 206. In one example, the transmission status indicates a subset of IP packets that was not successfully transmitted by the LTE processor 206 to the LTE network 106, i.e., the subset of IP packets includes IP packets that have been transmitted by the wireless UE 104 but were not positively acknowledged of being received, by LTE network 186 to wireless UE 104. The subset of IP packets also includes IP packets that were buffered by the LTE processor but could not be transmitted by the LTE processor 206 to the LTE network 106 due to the handover.

At step 816, the DSP 208 transmits the subset of IP packets to the RAN 108 via the wireless connection between the wireless UE 104 and the RAN 108. The subset of IP packets is determined by the transmission status the DSP 208 receives from the LTE processor 206. The method for performing the handover between the LTE network 106 and the RAN 108 then is complete at a step 818.

Figure 9:
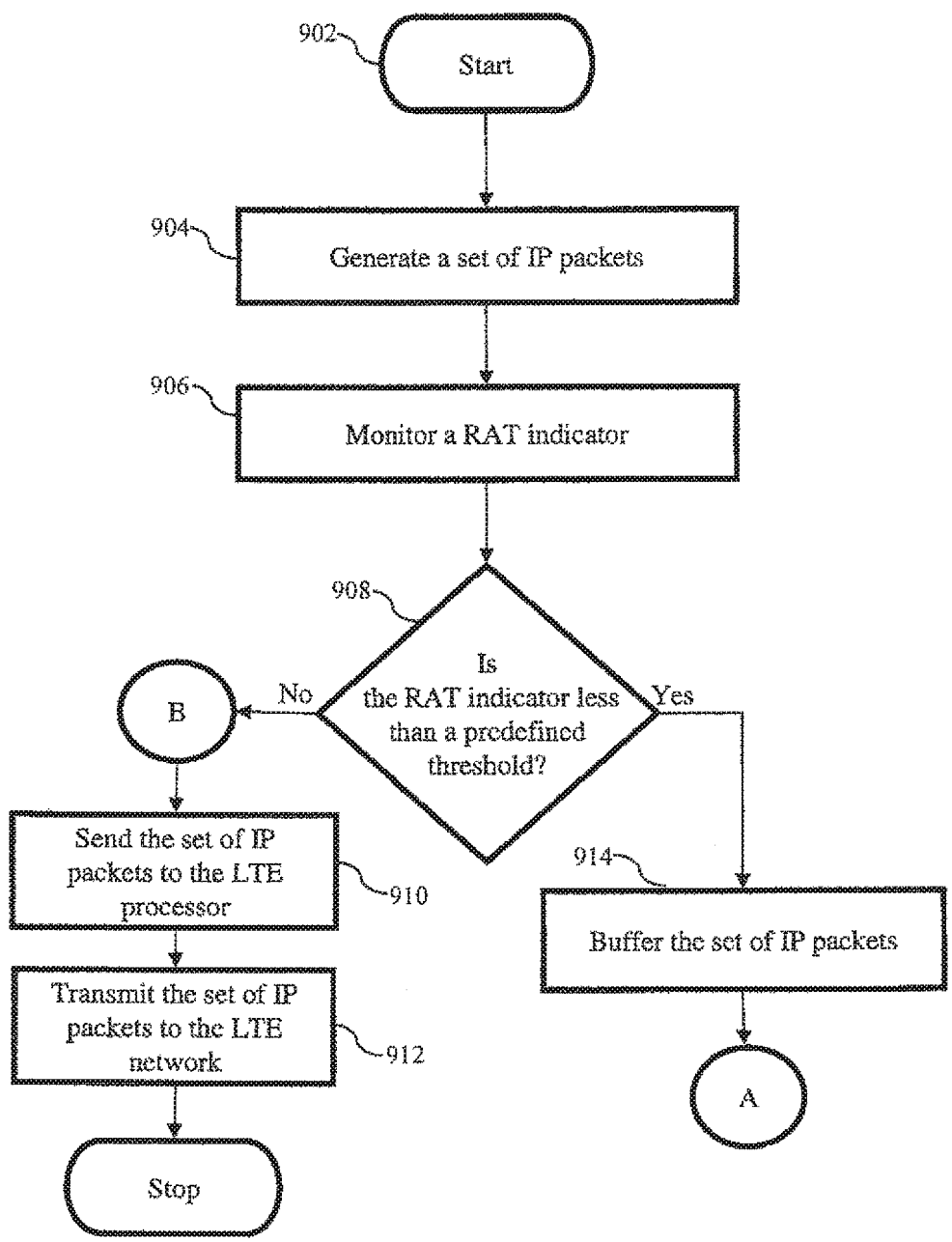
FIGS. 9, 10 and 11 are a flow diagram illustrating a method for performing the handover between the LTE network and the 2G/3G network, in accordance with another embodiment of the present invention.
Figure 10:
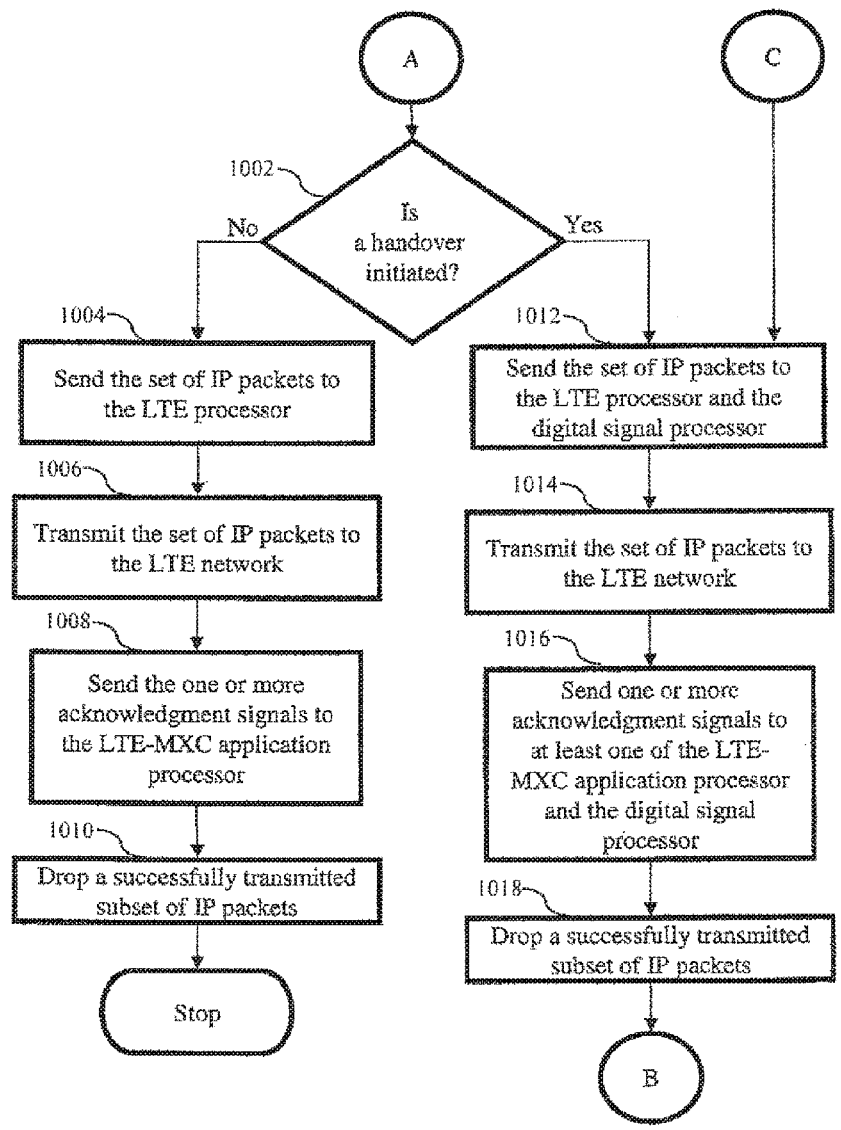
Figure 11:
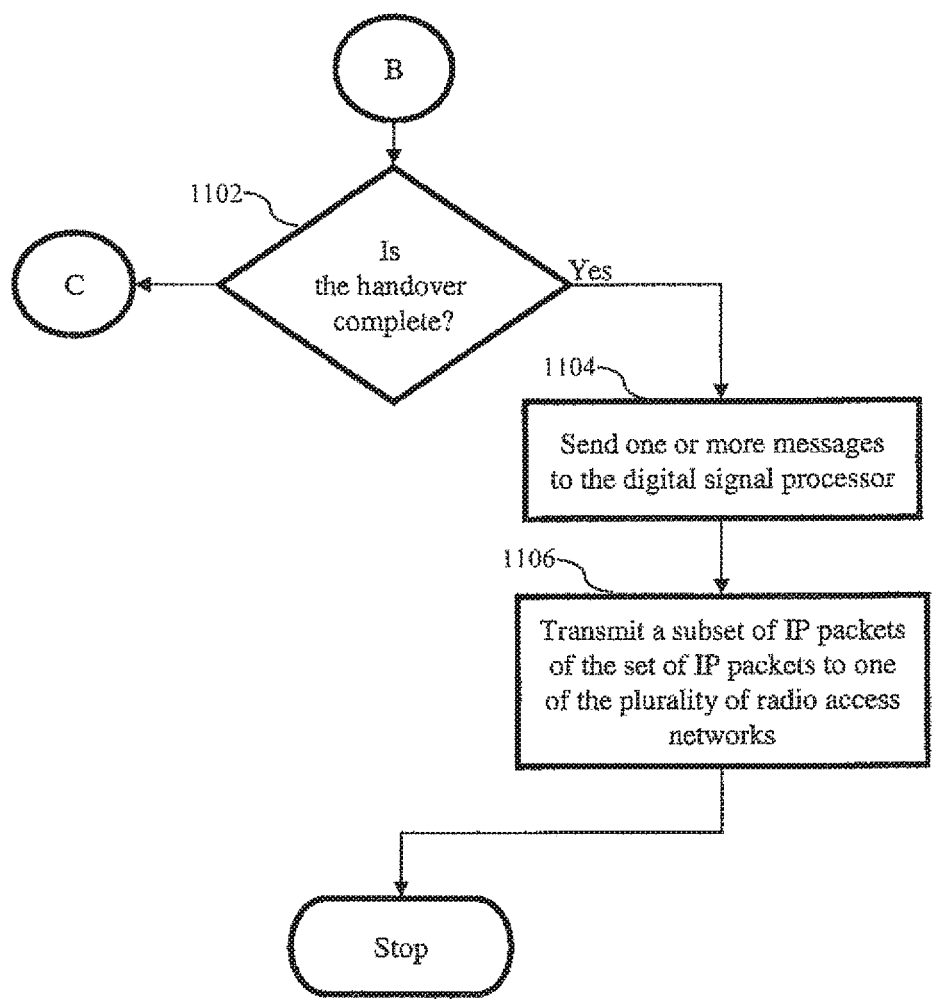

Referring to FIGS. 9, 10 and 11, a flow diagram illustrating a method for performing handover between the ITS network 106 and the 2G/3G RAN 108 is shown, in accordance with another embodiment of the present invention. The method is initiated at step 902. At step 904, the LTE-MXC application processor 202 generates a set of IP packets. The set of IP packets is generated by the applications running on the LTE-MXC application processor 202.

At step 906, the MMd_RRC module 212 of the LTE-MXC application processor 202 monitors the RAT indicator 508 to determine the present value of the RAT indicator 508. In one embodiment, the MMd_RRC module 212 monitors the signal strength the wireless UE 104 receives from the LTE network 106. The RAT indicator 508 is continuously monitored. In another embodiment, the RAT indicator 508 periodically monitored at fixed time of intervals.

At step 908, the MMd_RRC module 212 compares the present value of the RAT indicator 508 with the pre-defined threshold. In one embodiment, the MMd_RRC module 212 compares the signal strength the wireless UE 104 receives from the LTE network 106 with the pre-defined threshold of the signal strength.

At step 910, the LTE-MXC application processor 202 sends the set of IP packets to the LTE processor 206 when the present value of the RAT indicator 508 is greater than the pre-defined threshold.

At step 912, the LTE processor 206 transmits the set of IP packets to the LTE network 106 via the wireless connection between the wireless UE 104 and the LTE network 106. The method is completed after step 1012.

At step 914, the LTE-MXC application processor 202 buffers the set of IP packets by storing the set of IP packets in the buffer when the present value of the RAT indicator 508 is less than the pre-defined threshold.

At step 1002, the wireless UE 104 determines whether a handover has been initiated from the LTE network 106 to the RAN 108.

At step 1004, the LTE-MXC application processor 202 sends the set of IP packets to the LTE processor 106 via the USB when the handover has not been initiated. In another embodiment, the LTE-MXC application processor 202 sends the set of IP packets to the LTE processor 106 via the S-DMA link 210.

At step 1006, the LTE processor 206 transmits the set of IP packets to the LTE network 106 via the wireless connection between the wireless UE 104 and the LTE network 106.

At step 1008, the LTE processor 206 sends acknowledgement signals to the LTE-MXC application processor 202. These acknowledgement signals indicate a successfully transmitted subset of IP packets. The successfully transmitted subset of IP packets are IP packets that were positively acknowledged of being received, by the LTE network 106 to the wireless UE 104.

At step 1010, the LTE-MXC application processor 202 drops the successfully transmitted subset of IP packets by deleting the successfully transmitted subset of IP packets from the buffer. After step 1110, the method is completed.

At step 1012, the LTE-MXC application processor 202 sends the set of IP packets to the LTE processor 206 and the DSP 208 when the handover is initiated.

At step 1014, the LTE processor 206 transmits the set of IP packets to the LTE network 106 via the wireless connection between the wireless UE 104 and the LTE network 106.

At step 1016, the LTE processor 206 sends acknowledgement signals to the LTE-MXC application processor 202 and the DSP 208. In one embodiment, the acknowledgement signals are sent only to the LTE-MXC application processor 202. These acknowledgement signals indicate a successfully transmitted subset of IP packets. The successfully transmitted subset of IP packets are IP packets that have been positively acknowledged of being received, by the LTE network 106 to the wireless UE 104.

At step 1018, the LTE-MXC application processor 202 and the DSP 208 drop the successfully transmitted subset of IP packets based on the received acknowledgement signals. The LTE-MXC application processor 202 drops the successfully transmitted subset of IP packets by deleting the successfully transmitted subset of IP packets from the buffer. The DSP 208 drops the successfully transmitted subset IP packets by deleting the successfully transmitted subset IP packets from the local buffer present in the DSP 208.

At step 1102, the wireless UE 104 determines whether the handover of the wireless UE 104 from the LTE network 106 to the RAN 108 is complete. The handover is complete when the MMd_RRC module 214 establishes a wireless connection between the wireless UE 104 and the RAN 108.

At step 1104, the LTE processor 206 sends messages to the DSP 208 and the LTE-MXC application processor 202 when the handover is complete. The messages include the transmission status of the set of IP packets received by the LTE processor 206. In one example, the transmission status indicates a subset of IP packets that were not successfully transmitted to the LTE network 106, i.e., the subset of IP packets includes IP packets that have not been positively acknowledged of being received, by LTE network 106 to the wireless UE 104. The subset of IP packets also includes IP packets buffered by the LTE processor 206 but could not be transmitted by the LTE processor 206 due to the handover.

At step 1106, the DSP 208 transmits the subset of IP packets to the RAN 108 via the wireless connection between the wireless UE 104 and the RAN 106. The subset of IP packets is determined by the transmission status the DSP 208 received from the LTE processor 206. The method, is completed after step 1106.

In an example, the wireless UE 104 is used by a user in a car. The wireless UE 104 is connected to the LTE network 106 via a wireless connection. The wireless UE 104 transmits IP packets to the LTE network 106 via the wireless connection. As the car moves away from the LTE network 106 towards the RAN 108, the signal strength the wireless UE 104 receives from the LTE network 106 weakens. Due to the weak signal strength some of the IP packets transmitted over the wireless connection may get lost. Thus the wireless UE 104 starts buffering the IP packets when the signal strength is lower than the pre-defined threshold. Further, as the car continues moving towards the RAN 108, a handover is initiated to connect the wireless UE 104 to the RAN 108 so that the user does not experience an interruption in the communication process. On establishing a wireless connection between the wireless UE 104 and the RAN 108, the wireless UE 104 retransmits those IP packets that were either not transmitted to the LTE network 106 or were lost during their transmission to the LTE network 106.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An apparatus, comprising:
 at least one memory; and
 at least one baseband processor coupled to the at least one memory:
 wherein the at least one baseband processor and the at least one memory are configured to:
  establish a connection with a first radio access network (RAN), wherein the first RAN is configured according to a first radio access technology (RAT);
  buffer a plurality of data packets substantially upon a detection of a handover condition;
  establish a connection to a second RAN configured according to a second RAT, wherein the second RAT is different than the first RAT; and
  transmit a subset of the buffered plurality of data packets via the second RAN, wherein the subset of the buffered packets is determined by a transmission status of individual packets of the plurality of data packets.

2. The apparatus of claim 1,
 wherein the subset of the buffered plurality of data packets comprises buffered plurality of data packets that were not transmitted over the connection with the first RAN due to the handover from the first RAN to the second RAN.

3. The apparatus of claim 1,
 wherein packets are dropped from buffered plurality of data packets based on received acknowledgement signals from the first RAN.

4. The apparatus of claim 1,
 wherein the detection of the handover condition occurs when a monitored RAT indicator is less than a pre-defined threshold.

5. The apparatus of claim 1,
 wherein the at least one baseband processor and at least one memory are further configured to:
  monitor a RAT indicator, wherein the detection of the handover condition occurs when the monitored RAT indicator is less than a pre-defined threshold.

6. The apparatus of claim 1,
 wherein the transmission status of individual packets includes information about one or more packets that were not successfully transmitted to the first RAN.

7. The apparatus of claim 1,
wherein the first RAN comprises a Long Term Evolution (LTE) enabled network, and the second RAN comprises a Universal Mobile Telecommunication System (UMTS) enabled network.

8. A mobile device, comprising:
at least one antenna; and
at least one processor coupled to the at least one antenna, wherein the at least one processor is configured to:
 establish, via the at least one antenna, a connection with a first radio access network (RAN), wherein the first RAN is configured according to a first radio access technology (RAT);
 buffer a plurality of data packets substantially upon a detection of a handover condition;
 establish, via the at least one antenna, a connection to a second RAN configured according to a second RAT, wherein the second RAT is different than the first RAT; and
 transmit, via the at least one antenna, a subset of the buffered plurality of data packets via the second RAN, wherein the subset of the buffered packets is determined by a transmission status of individual packets of the plurality of data packets.

9. The mobile device of claim 8,
wherein the subset of the buffered plurality of data packets comprises buffered plurality of data packets that were not transmitted over the connection with the first RAN due to the handover from the first RAN to the second RAN.

10. The mobile device of claim 8,
wherein packets are dropped from buffered plurality of data packets based on received acknowledgement signals from the first RAN.

11. The mobile device of claim 8,
wherein the detection of the handover condition occurs when a monitored RAT indicator is less than a pre-defined threshold.

12. The mobile device of claim 8,
wherein the at least one processor is further configured to:
 monitor a RAT indicator, wherein the detection of the handover condition occurs when the monitored RAT indicator is less than a pre-defined threshold.

13. The mobile device of claim 8,
wherein the transmission status of individual packets includes information about one or more packets that were not successfully transmitted to the first RAN.

14. The mobile device of claim 8,
wherein the first RAN comprises a Long Term Evolution (LTE) enabled network, and the second RAN comprises a Universal Mobile Telecommunication System (UMTS) enabled network.

15. A method for performing handover of a mobile device between a first radio access network (RAN) and a second RAN, the first and second RANs configured according to different radio access technologies (RAT), the method comprising:
 establishing a connection with the first RAN;
 buffering a plurality of data packets at the mobile device, wherein the buffering occurs substantially upon a detection of a handover condition;
 establishing a connection with the second RAN; and
 transmitting a subset of the buffered plurality of data packets via the second RAN from the mobile device, wherein the subset of the buffered packets is determined by a transmission status of individual packets of the plurality of data packets.

16. The method of claim 15,
wherein the subset of the buffered plurality of data packets comprises buffered plurality of data packets that were not transmitted over the connection with the first RAN due to the handover from the first RAN to the second RAN.

17. The method of claim 15,
wherein packets are dropped from buffered plurality of data packets based on received acknowledgement signals from the first RAN.

18. The method of claim 15,
wherein the detection of the handover condition occurs when a monitored RAT indicator is less than a pre-defined threshold.

19. The method of claim 15,
further comprising:
 monitoring a RAT indicator, wherein the detection of the handover condition occurs when the monitored RAT indicator is less than a pre-defined threshold.

20. The method of claim 15,
wherein the transmission status of individual packets includes information about one or more packets that were not successfully transmitted to the first RAN.

* * * * *